Sept. 16, 1958 Y. PONSAR 2,851,861
WATER DISTRIBUTION CANAL SYSTEMS
Filed July 13, 1951 3 Sheets-Sheet 1
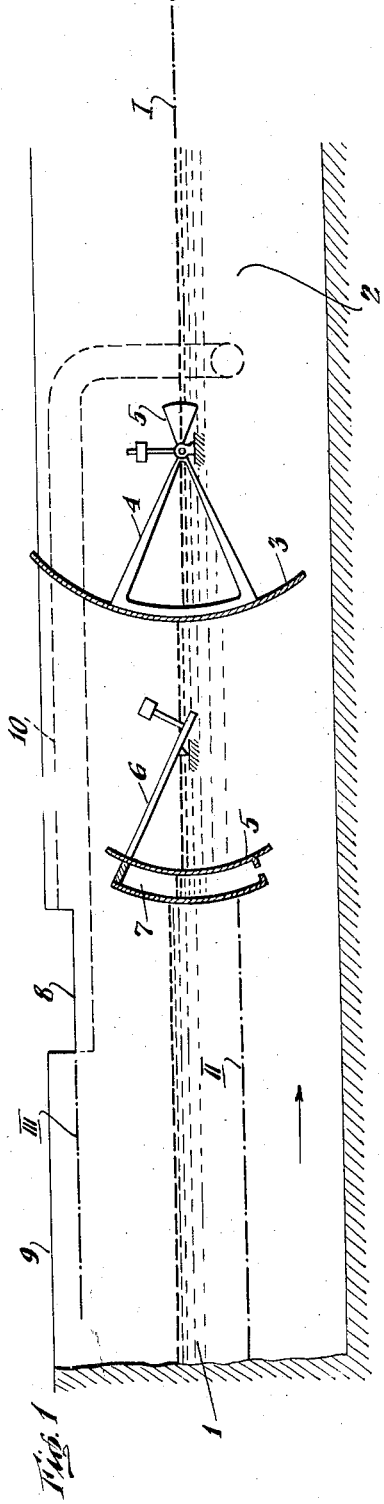
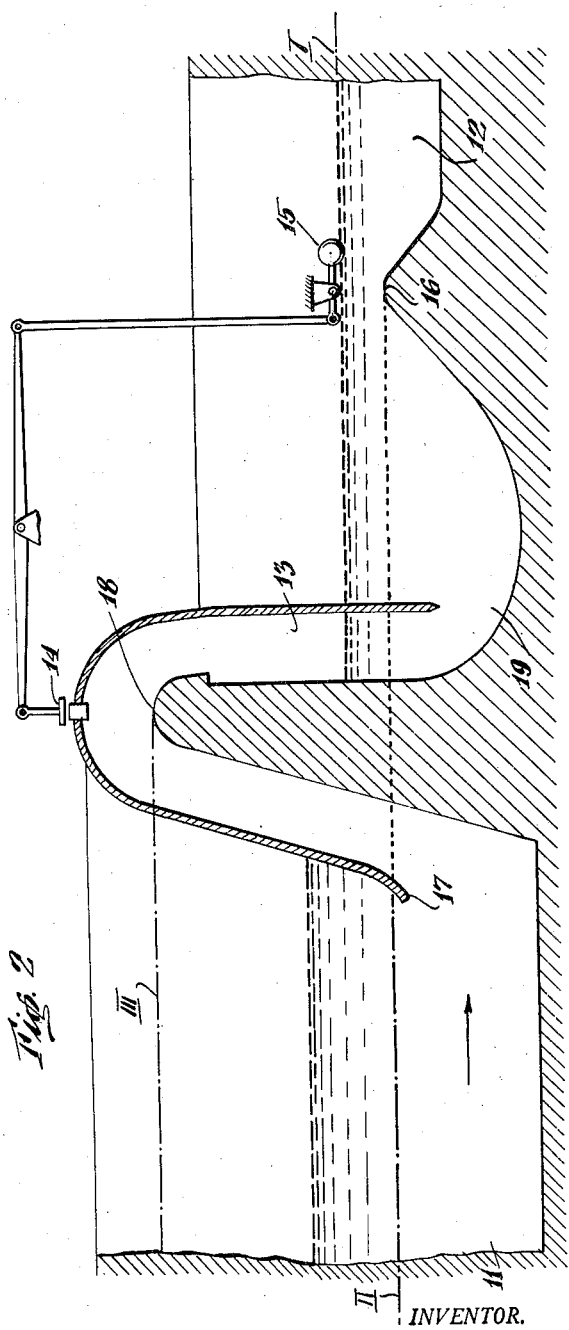
INVENTOR.
Yves Ponsar
BY
George H. Corey
ATTORNEY

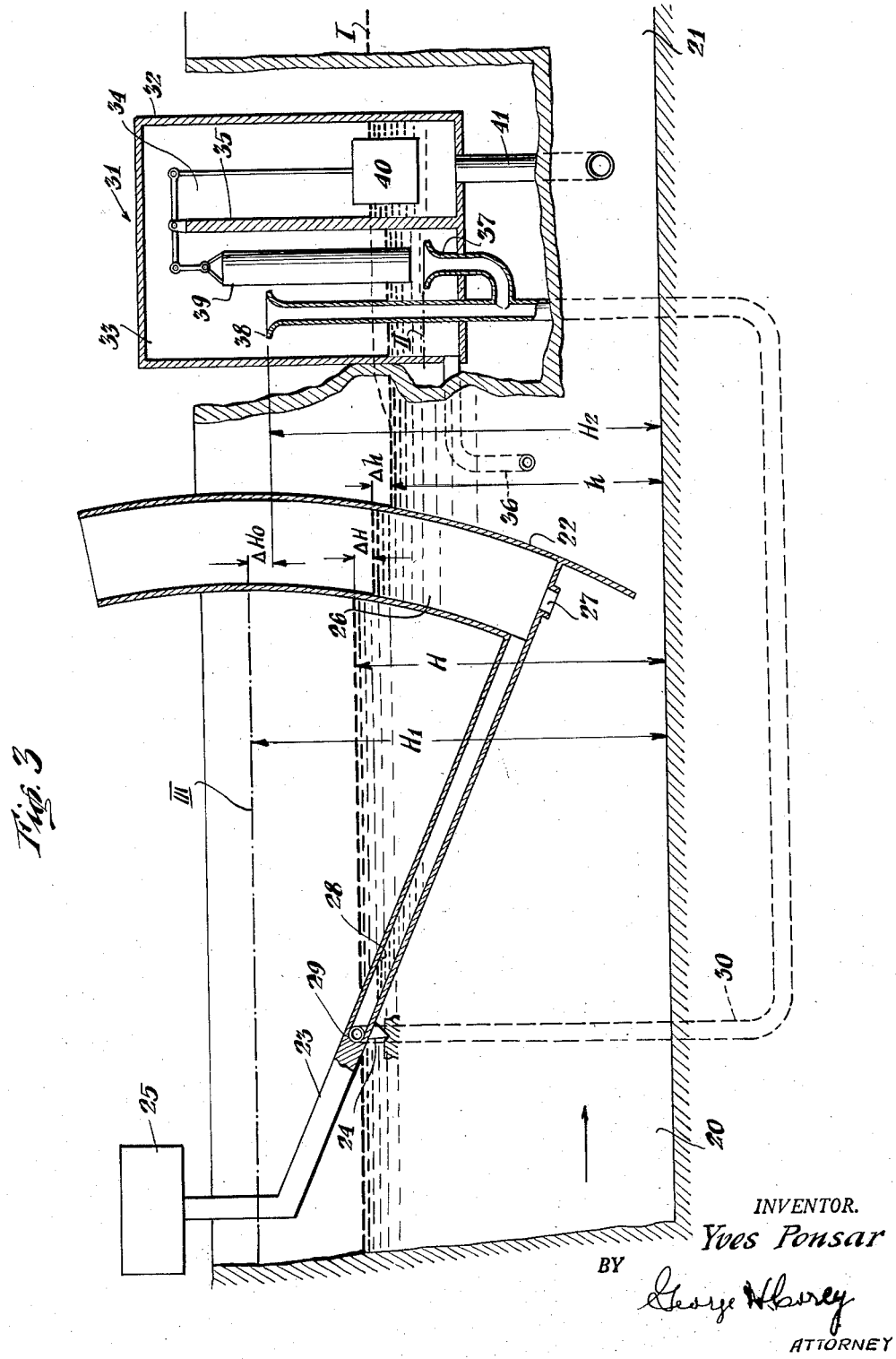

Sept. 16, 1958  Y. PONSAR  2,851,861
WATER DISTRIBUTION CANAL SYSTEMS
Filed July 13, 1951  3 Sheets-Sheet 3
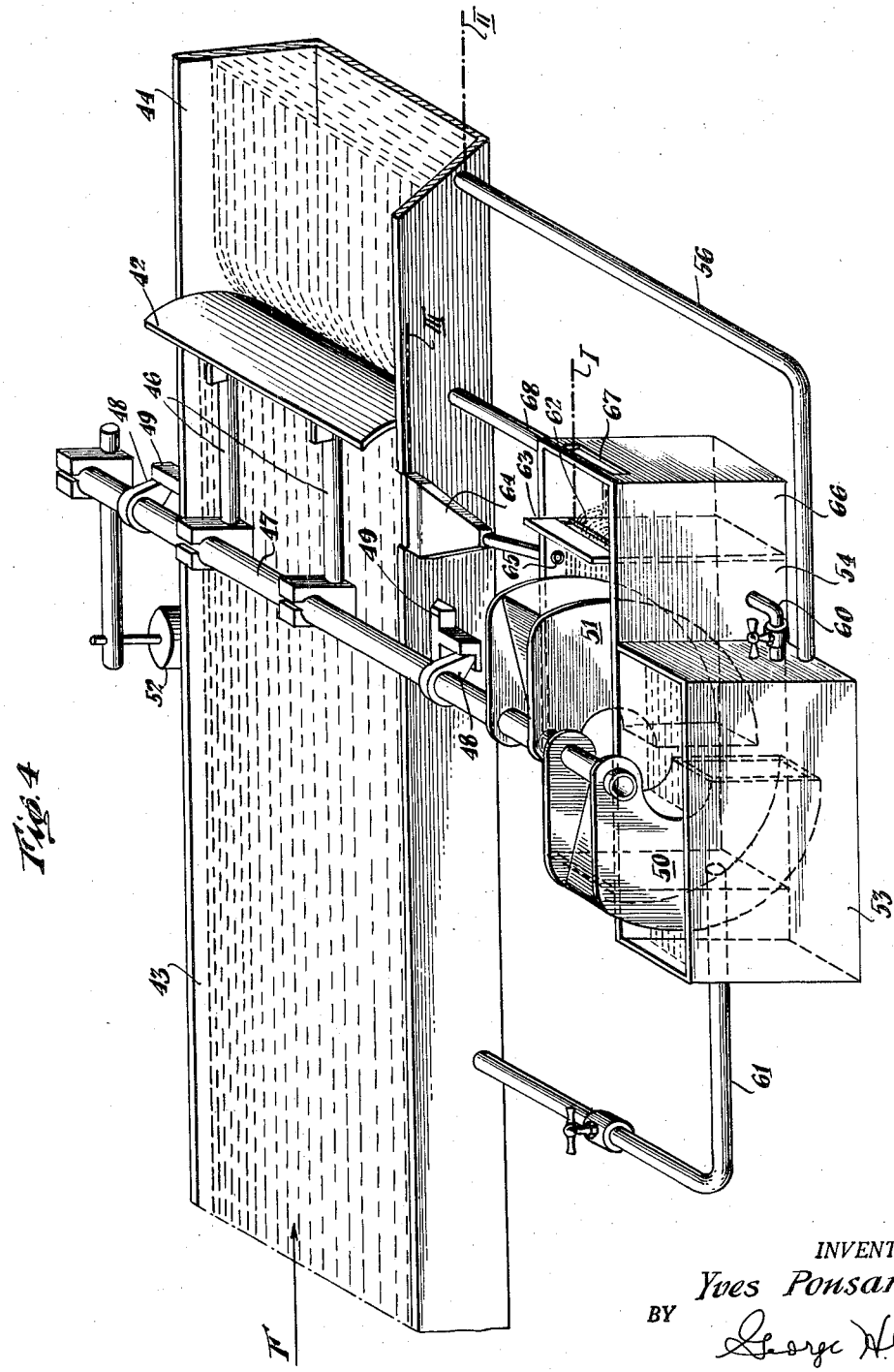
INVENTOR.
Yves Ponsar
BY George H. Corey
ATTORNEY

United States Patent Office 2,851,861
Patented Sept. 16, 1958

2,851,861

WATER DISTRIBUTION CANAL SYSTEMS

Yves Ponsar, Bois-Colombes, France, assignor to Etablissements Neyrpic, Grenoble, France, a corporation of France Application July 13, 1951, Serial No. 236,503

Claims priority, application France July 17, 1950

3 Claims. (Cl. 61—25)

The present invention relates to canal systems for distributing water, and particularly to systems in which the canals are separated into sections by gates controlling the flow of water, and wherein each gate is controlled in accordance with the water level on its downstream side.

In prior water distribution canal systems of the type described, each flow regulating device has been operated with the single object of maintaining a constant level on its downstream side. In such systems, any change in level in one section results in a movement of the gate at the upstream end of the section and a consequent change in the level of the next section upstream, so that changes in level due to changes in demand are transmitted automatically upstream by the action of the level variations themselves.

Such a system is shown, for example, in my copending application for U. S. Letters Patent Serial No. 13,998, filed March 10, 1948, now abandoned, entitled "Apparatus for Controlling Flow of Water in Distributing Canals." That system, which is applied to canals having a gradient sufficiently low that the flow is fluvial, consists in separating each canal into successive reaches or sections whose ends are defined by regulating devices, each of which maintains the level constant on its downstream side.

Under the normal conditions of operation of such a canal system, the described regulating devices automatically adjust the flow from one reach to the next in accordance with the downstream demand for water, and at the same time maintain the level constant at the upstream end of each reach.

Two principal problems are encountered in such a system. In the first place, if the supply of water to the canal system is insufficient to take care of the demand, the level in the first reach and then in the successive downstream reaches, falls below the level necessary to assure the supply of water to the individual outlets; ultimately, if the supply to the network ceases, the reaches are completely emptied from the upstream end to the downstream end of the system with all the inconveniences which are produced by the drying up of the canals.

In the second place, in the case of a large and sudden reduction in the downstream demand for water, the supply from the upstream end continues during the time necessary for the upstream propagation of the variations in level which are required to actuate the successive regulating devices separating the reaches. The volume of water which enters the system during this time may cause an overflow of the canals.

An object of the present invention is to eliminate these inconveniences by providing an improved method of automatically regulating the levels in the canal sections of an irrigation canal system.

This object is accomplished by equipping each regulating device separating two reaches with apparatus which maintains the downstream level constant as long as the upstream level is located between two predetermined limits, and means which prevents the level upstream from exceeding those limits. In other words, the upstream level is prevented from falling below a selected minimum value or from increasing above a selected maximum value.

Other objects and advantages of the invention will become apparent from a consideration of the accompanying specification and drawing, in which Figs. 1, 2 and 3 are schematic views in elevational cross-section of three different forms of apparatus for regulating the flow through a canal in accordance with the invention.

Fig. 4 is a perspective view of still another form of apparatus embodying the invention.

Figure 1

This figure shows flow regulating apparatus separating an upstream reach or section 1 of a canal from a downstream reach 2. This apparatus includes a gate 3 supported by a pivoted lever 4 which carries a float 5 located in the downstream reach 2. The gate 3 is operated by the float 5 to maintain the water level in the downstream reach 2 at a constant elevation indicated in the drawing by the dot-dash line I.

The gate 3 and its associated parts may for example be of the type shown in U. S. Patent No. 2,168,177, issued to Pierre F. Danel.

Upstream from the gate 3 is another gate 5 which closes when the water level in the upstream reach 1 falls below an elevation indicated in the drawing by the dot-dash line II. The gate 5 is supported by a pivoted lever 6. A float chamber 7 is attached to the upstream face of the gate 5, so that that gate is positioned in accordance with the upstream water level. When that level falls to the elevation indicated at II, gate 5 closes. The float chamber 7 may, as shown, have a restricted opening in its bottom to stabilize the action of the gate, as shown and claimed in U. S. patent application Serial No. 184,608, filed September 13, 1950 by Francois Laszlo, now Patent No. 2,699,652.

As long as the upstream water level is above elevation I, the gate 3 controls the flow. If the upstream water level falls below elevation I, the apparatus cannot of course maintain the downstream water level at I, so gate 3 moves toward open position, and gate 5 becomes the principal restriction controlling the flow. Gate 5 follows the upstream level, and as indicated above, closes when the upstream level falls to elevation II.

There is shown at 8 an overflow weir in the bank 9 of the upstream reach of the canal. The sill of this weir is located at an elevation indicated by the dot-dash line III, and establishes the maximum upstream level. If the upstream water level increases above that limit, the water flows over this weir and through a by-pass conduit 10 which returns to the main canal downstream from the regulating apparatus.

Figure 2

In this modification of the invention, an upstream reach 11 is separated from a downstream reach 12 by a controlled siphon 13. The flow through this siphon is regulated by a valve 14 operated by a float 15 disposed in the downstream reach 12 and connected to the valve by a suitable linkage. Valve 14 controls the entry of air into the crest of the siphon to regulate the flow therethrough in a manner to maintain the level of the downstream reach at a predetermined elevation I.

The regulation of the flow through a siphon in this manner is more fully described and claimed in U. S. patent application Serial No. 794,686, filed December 30, 1947 by Pierre F. Danel, now U. S. Patent No. 2,642,888.

A sill 16 is disposed downstream from the siphon at an elevation II. If the upstream level falls to elevation II, the siphon cannot discharge above that level and hence will no longer flow. Consequently the upstream level can no longer fall. The same result may be obtained without the sill 16 by placing the lip 17 of the upstream branch of the siphon at elevation II so that the siphon will be broken by the entrance of air whenever the upstream level falls below that elevation.

The sill 18 at the crest of the siphon is located at an elevation below that of the side walls of the upstream reach. When the upstream level exceeds that elevation, water will flow over the sill even though the valve 14 is wide open.

A priming basin 19, into which the downstream branch of the siphon discharges, provides water for priming the downstream leg of the siphon even if the downstream reach 12 is completely empty. Any suitable air pumping means may be provided for priming the siphon.

*Figure 3*

This figure illustrates a modification of the invention utilizing a gate of the "differential sector" type. In this figure, an upstream reach 20 is separated from a downstream reach 21 by a differential sector gate 22. This gate has a cylindrical sector form with its convex face directed downstream to facilitate construction and to make it easier for the water to flow under the gate. The gate 22 is supported by a lever 23 pivoted at 24 and carrying a counterweight 25. A chamber 26 is located on the concave side of the gate and communicates through an orifice 27 with the upstream reach. This chamber is also connected to the downstream reach through a conduit 28 extending along lever 23, and conduits 29 and 30 which leads to a relay apparatus generally indicated at 31. This relay apparatus includes a tank 32 divided into two compartments 33 and 34 by a wall 35. The conduit 30 terminates within the compartment 33, where it is provided with a pair of vertically spaced overflow weirs 37 and 38. Compartment 33 is connected with the downstream reach through a pipe 36 which opens into the canal immediately downstream from the gate 22 within the zone where the velocity of the water passing through the gate produces a local decrease in the water level. The flow through the weir 37 is regulated by a valve 39, which may be for example a chimney valve. The valve 39 is operated by a float 40 acting through a suitable linkage. The float 40 is located in compartment 34, which communicates with the downstream reach through a pipe 41 whose outlet is spaced still further downstream from the sector gate, so that the float 40 follows the variations in the downstream level.

Under normal conditons, there is established a continuous flow from the upstream reach through a hydraulic relay circuit which includes restriction 27, chamber 26, conduits 28, 29, 30, the parallel weirs 37 and 38, compartment 33, and conduit 36. This flow through the relay circuit produces a loss in head across restriction 27, which loss in head is measured by the difference $\Delta H$ between the upstream water level H and the water level within the chamber 26. The counterweight 25 is designed so that for a predetermined difference in level, $\Delta H_0$, the assembly is in equilibrium at any position. If the difference $\Delta H$ between these levels is less than $\Delta H_0$, the gate moves in a closing direction; if it is greater, the gate moves in an opening direction. The gate being in equilibrium, the level in the chamber 26 is at an elevation lower than the upstream level by $\Delta H_0$. Because of the loss of head through the pipe 30, weir 37 and valve 39, there exists a difference $\Delta h$ between the level within the chamber 26 and the level $h$ immediately downstream from the sector gate.

As previously mentioned, the float 40 follows variations in the downstream level. When the latter level tends to increase, the float rises slightly, which moves the valve 39 in a closing direction. Consequently, the loss of head at that point in the relay circuit is increased. This causes the level in the chamber 26 to rise, $\Delta H$ decreases and the gate moves in a closing direction.

On the other hand, if the downstream level tends to drop, the float 40 opens the valve 39, decreasing the loss of head at that point in the relay circuit; the level in the chamber 26 is lowered, $\Delta H$ increases and the gate moves in an opening direction.

If the upstream level falls below the elevation II of the weir 37, the flow of water through the relay is immediately interrupted. The level in the chamber 26 then becomes equal to the upstream level and the gate closes completely, preventing the complete draining of the upstream reach.

If the downstream demand ceases, the float 40 tends to close the valve 39 and eventually closes it completely. The flow through the relay circuit is again interrupted. The level in the chamber 26 and in the weir 38 then becomes equal to the upstream level. If the upstream level continues to rise, the weir 38 eventually overflows.

The maximum elevation $H_1$ of the upstream level is shown at III in the drawing and is determined by the elevation of the weir 38. The sill of weir 38 is located at an elevation:

$$H_2 = H_1 - \Delta H_0$$

When the level in the chamber 26 reaches the elevation $H_2$ the weir 38 overflows and the level in the chamber 26 no longer increases with the upstream level. If thereafter the upstream level reaches the elevation $H_1$ then the difference in level between the chamber 26 and the upstream level becomes $\Delta H_0$. If the upstream level increases above the maximum level $H_1$, then the gate opens.

It may be seen from the foregoing that when the upstream level is between elevations II and III, valve 39 and float 40 control the position of gate 22 and tend to maintain the downstream water level substantially constant at I. When the upstream water lever falls below elevation I, the gate cannot of course maintain the downstream water level at I. The valve 39 then opens wide and the gate 22 also opens to maintain the level as close to I as possible. If the upstream level falls as far as II, the apparatus overrides the action of float 40 and valve 39, and the gate 22 closes, as explained above. If the upstream level rises above III, the apparatus also overrides the float 40 and valve 39 and opens the gate 22.

The outlet of conduit 36 is located in the zone of low pressure just downstream from the gate in order to provide a greater head across the relay circuit under normal (gate partly open) conditions and thereby secure a more sensitive control.

*Figure 4*

Fig. 4 illustrates a modified form of apparatus constructed in accordance with the invention, utilizing sensitive gate operating mechanism of the type described and claimed in French application P. V. No. 3,200 (Isere), filed October 27, 1950, which corresponds to U. S. application No. 252,057, filed October 19, 1951 (C–727) now U. S. Patent No. 2,802,363.

In Fig. 4, a gate 42 separates an upstream reach 43 from a downstream reach 44. The gate 42 is in the form of a cylindrical sector and is connected by arms 46 to a rod 47 which oscillates about a horizontal axis and is supported at its ends by knife edge bearings 48 resting on supports 49.

On the rod 47 are mounted two hollow bodies 50 and 51, which are generally sector-shaped and concentric with the axis of oscillation of the rod 47. These bodies 50 and 51 are truncated at their upper ends. This axis of oscillation is a line connecting the points of contact of the knife edges 48 with their supports 49 and is located substantially below the rod 47. A counterweight 52 is mounted on the rod 47 to compensate the weight of the gate 42 and the effect produced by the truncation of the bodies 50 and 51. The bodies 50 and 51 are respectively partially immersed in two tanks 53 and 54. The tank 53, hereinafter referred to as the motor tank, is connected by pipe 56 to the canal reach 44 downstream from the gate 42. The tank 54 is hereinafter referred to as the pilot tank. A restricted conduit 60 connects the tanks 53 and 54, and a conduit 61 connects the tank 54 to the upstream reach 43. An overflow weir 62 is located in the tank 54 and is surmounted by a mask 63. A spillover 64 from the upstream reach 43 empties at 65 into the tank 54 behind the overflow weir 62. Downstream from weir 62 is a chamber 66 provided with a spillover 67 and connected through a pipe 68 to the downstream reach 44 immediately below the gate in a zone where the level of the water is lowered by the velocity of the water passing through the gate.

In normal operation, when the upstream level is below the spillover 64, but is high enough so that the inlet of the pipe 61 is covered with water, the water circulates through pipe 61 into the tank 54 and thence through tank 54, over the weir 62 into the chamber 66 and is returned to the canal by pipe 68. The capacity of weir 62 is greater than that of pipe 61, so that a constant level is maintained in the pilot tank 54.

The level in tank 53 is the same as the downstream level. If any difference in level appears between tanks 53 and 54, due to variation in the downstream level, the assembly including bodies 50 and 51 rotates about its axis in a sense to operate gate 42 to restore the downstream level to the same elevation as the level maintained in tank 54.

If the level upstream from the gate reaches the elevation of the spillover 64, the latter feeds the tank 54 which thereby receives an increased flow. The capacities of pipes 61 and 65 together are greater than that of weir 62, so that the level in tank 54 is raised above the lower edge of the mask 63. The elevation at which the apparatus maintains the downstream level is therefore raised along with the level in tank 54. The opening through the gate 42 for the passage of water is thereby increased, preventing the water from overflowing the canal.

The spillover 67 acts to prevent the water from filling chamber 66 to an abnormal level and flooding the weir 62.

If the supply of water to the canal decreases and the upstream level falls, eventually the weir 62 no longer discharges into the chamber 66. The level in the pilot tank 54 then follows any further decrease in the upstream level. The elevation at which the apparatus maintains the downstream level is thereby decreased. The flow of water permitted by the gate is reduced, thereby allowing the upstream reach to conserve a greater proportion of the water which it receives.

If the reduction in the supply of water to the canal continues, eventually the level in the downstream reach will fall enough to uncover the outlet of the pipe 56. The level in the motor tank 53 is then established to correspond with the elevation of the outlet of pipe 56. The connecting pipe 60 is effective to supply the tank 53 under these conditions so as to maintain the level in that tank regardless of the movements of the body 50. The functions of the two bodies 50 and 51 and their tanks 53 and 54 are now reversed. The body 50 and tank 53 serve as a pilot and the body 51 and tank 54 act as a motor to operate the gate so that the level in the tank 54 remains at the same level as the constant value established in the tank 53. The level upstream from the gate, is thereby established at a constant minimum elevation. The apparatus closes the gate, if necessary to prevent the upstream level from falling any further and thereby prevents the drying up of the canal.

The danger of overflowing or draining of the canal is thereby prevented in the apparatus described. The maximum and minimum limits of the upstream level may be regulated by adjusting the elevations of the spillover 64 and of the pipe outlet 56 into the canal.

It should be understood that if the gate allows an excessive flow to pass into the downstream reach, the successive downstream gates will function in the same manner and the excess flow will be finally discharged into any suitable drain.

The different examples given above are not limitative. The invention may utilize other forms of apparatus for the transmission of successive modifications in level from one reach to another through the simple action of the level changes. This transmission of level changes may be accomplished by other apparatus of various known types (mechanical, electrical, electronic, etc.) without departing from the spirit of the invention.

I claim:

1. Apparatus for controlling the flow of water through a canal, comprising a normally open gate in the canal and movable to vary the flow of water therethrough, first and second tanks, a first conduit connecting said first tank to the canal upstream from the gate, a second conduit connecting said second tank to an outlet located in the canal downstream from the gate at a point spaced above the canal bottom, first and second hollow bodies partially immersed respectively in said first and second tanks, means rigidly connecting said bodies and said gate for concurrent movement, said bodies being attached to said connecting means so that an increase in level in the first tank moves said first body in a direction to open the gate and an increase in level in said second tank moves said second body in a direction to close the gate, a weir for discharging water from said first tank, said weir having a greater capacity than said first conduit and being thereby effective to maintain a constant level in said first tank when the latter is supplied only by said first conduit, said first and second bodies then cooperating to position the gate to maintain the downstream water level substantially constant, a spillover for discharging water from said canal upstream from the gate when the water level therein exceeds a predetermined upper limit, a third conduit for conveying water from said spillover to said first tank, said first and third conduits having a total capacity greater than said weir and being effective when acting together to raise the level in said first tank and thereby move said first body in a direction to open said gate, a fourth conduit providing a restricted connection between said first and second tanks, said fourth conduit being effective when the level in the canal downstream from the gate drops below the outlet of said second conduit to maintain the level in said second tank at the level of the outlet, said first and second hollow bodies being then effective to move said gate in a closing direction if the level in said first tank drops below the level in said second tank.

2. Apparatus for controlling the flow of water through a canal, comprising a normally open gate in the canal and movable to vary the flow of water therethrough, first and second tanks, a first conduit connecting said first tank to the canal upstream from the gate, a second conduit connecting said second tank to an outlet located in the canal downstream from the gate, first and second hollow bodies partially immersed respectively in said first and second tanks, means rigidly connecting said bodies and said gate for concurrent movement, said bodies being attached to said connecting means so that an increase in level in the first tank moves said first body in a direction to open the gate and an increase in level in said second tank moves said second body in a direction to close the gate, a weir for discharging water from said first tank, said weir having a greater capacity than said first conduit and being thereby effective to maintain a constant level in said first tank when the latter is supplied only by said first conduit, said first and second bodies then cooperating to position the gate to maintain the downstream water level substantially constant, a spillover for discharging water from said canal upstream from the gate when the water level therein exceeds a predetermined upper limit, and a third conduit for conveying water from said spillover to said first tank, said first and third conduits having a total capacity greater than said weir and being effective when acting together to raise the level in said first tank and thereby move said first body in a direction to open said gate.

3. Apparatus for controlling the flow of water through a canal, comprising a normally open gate in the canal and movable to vary the flow of water in the canal, first and second tanks, a first conduit connecting said first tank to the canal upstream from the gate, a second conduit connecting said second tank to an outlet located in the canal downstream from the gate at a point spaced above the canal bottom, first and second hollow bodies partially immersed respectively in said first and second tanks, means rigidly connecting said bodies and said gate for concurrent movement, said bodies being attached to said connecting means so that an increase in level in the first tank moves said first body in a direction to open the gate and an increase in level in said second tank moves said second body in a direction to close the gate, a weir for discharging water from said first tank, said weir having a greater capacity than said first conduit and being thereby effective to maintain a constant level in said first tank when the latter is supplied only by said first conduit, said first and second bodies then cooperating to position the gate to maintain the downstream water level substantially constant, means providing a restricted fluid communication between said first and second tanks, said restricted communication means being effective when the level in the canal downstream from the gate drops below said outlet to maintain the level in said second tank at the level of the outlet, said first and second hollow bodies being then effective to move said gate in a closing direction if the level in said first tank drops below the level in said second tank.

References Cited in the file of this patent
UNITED STATES PATENTS

| | | |
|---|---|---|
| 870,256 | Smith | Nov. 5, 1907 |
| 973,172 | Collar | Oct. 18, 1910 |
| 2,645,089 | Ponsar | July 14, 1953 |
| 2,699,652 | Laszlo | Jan. 18, 1955 |